Nov. 16, 1965    V. NEJEZCHLEB    3,217,956
DECREASING TAPE WEAR ON EXIT SIDE OF VACUUM COLUMN
Filed June 26, 1961
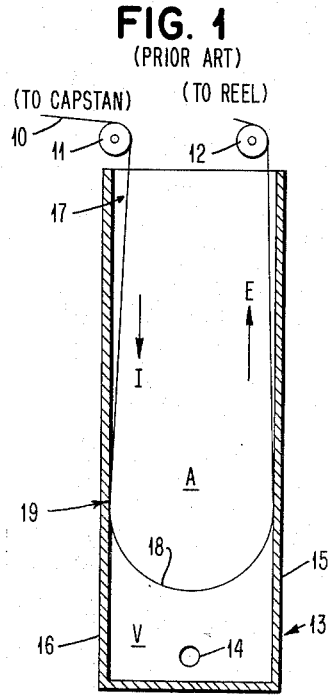
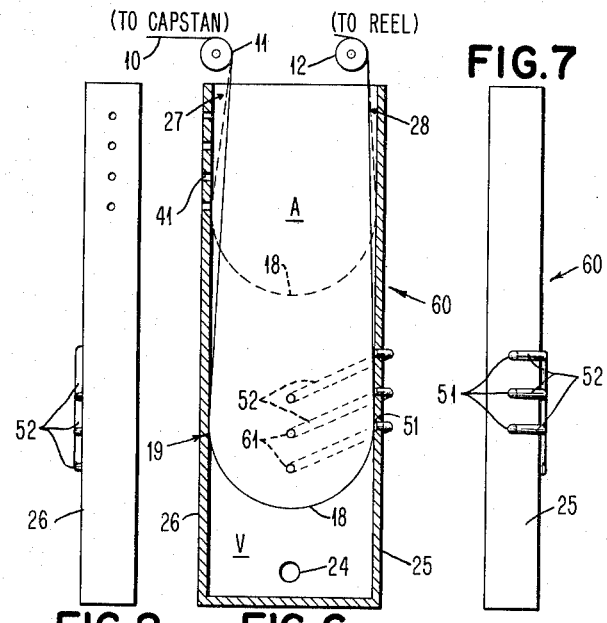
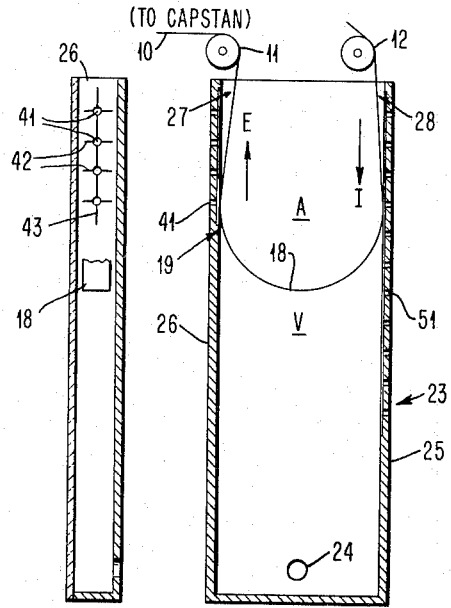
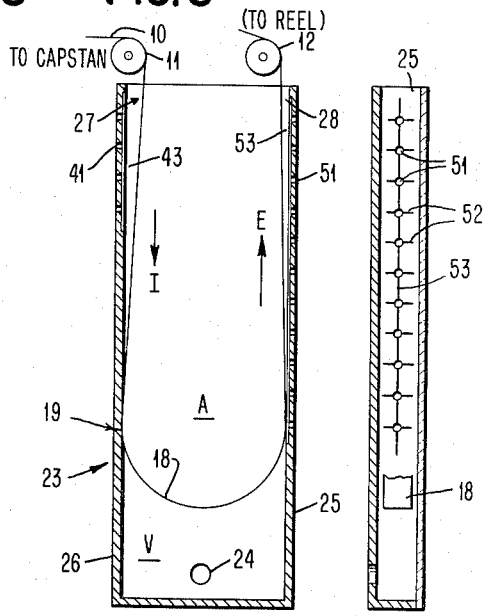
INVENTOR
VLADIMIR NEJEZCHLEB
BY Bernard M. Goldman
ATTORNEY

United States Patent Office 3,217,956
Patented Nov. 16, 1965

3,217,956
DECREASING TAPE WEAR ON EXIT SIDE OF VACUUM COLUMN

Vladimir Nejezchleb, Poughkeepsie, N.Y., assignor to International Business Machines Corporation, New York, N.Y., a corporation of New York
Filed June 26, 1961, Ser. No. 119,414
3 Claims. (Cl. 226—118)

This invention relates to means for reducing wear caused by magnetic-tape rubbing against a side of a vacuum column in a tape transport machine.

Vacuum columns are widely used as a buffer element in high-speed computer tape machines. U.S. Patent No. 2,792,217 to J. A. Weidenhammer describes a Tape Feed Mechanism having vacuum columns. Tape enters and exits at one end of a vacuum column, and a vacuum pump is connected to the opposite end of the column. A loop is formed across the column to divide the vacuum (lower pressure) part of the column from the remainder of the column which has atmospheric pressure.

When the tape is moving at a high speed, such as of the order of 100 inches per second, molecules of air tend to be moved with the tape due to their frictional engagement with the tape surface. On the incoming side of the column where the tape enters, molecules of air are pulled within a zone between the tape and an adjacent side of the column to increase the pressure slightly above atmospheric. This provides air lubrication which prevents the tape on the incoming side from touching the vacuum column until where the tape loop begins to form. The sudden drop in pressure where the loop begins causes line contact between the tape and the incoming side of the column.

The tape loop terminates on the opposite side of the column, and the tape moves up this side to exit from the column; hence this side is herein defined as the "exit side" of the column. Air molecules between the tape and the exit side tend to be pumped out of the column due to friction with the exciting tape. As a result, the air pressure between the tape and the exit side is lower than atmospheric pressure on the opposite side of the tape, which pushes it against the exit side of the column, so that tape rubbing occurs along a substantial length of the column exit side.

It is therefore the primary object of this invention to provide means for reducing the area of tape rubbing along the exit side of a vacuum column.

The invention is made by forming at least one opening through the exit side of the column at a position slightly above the lowest point of steady contact of the tape with the exit side. Plural openings can be provided above the one opening if required to increase their effectiveness.

Air leakage into the vacuum chamber through an opening can be prevented by connecting a tube between the opening in the exit wall and a corresponding opening in another wall of the column adjacent to the exit side. When the tape loop moves above both openings, each is subject to the vacuum; and accordingly the vacuum is not subject to a connection to the atmosphere through either opening.

Where forward and backward tape movement is provided, either of two column sides can be the exit side. Furthermore, machines such as that described in Patent 2,792,217 have an upper and lower position for a tape loop in a column depending on direction of tape movements. Thus, each exit side has associated with it a different steady loop position, and the position of the openings in the two exit sides are positioned differently.

The foregoing and other objects, features and advantages of the invention will be apparent from the following more particular description of preferred embodiments of the invention, as illustrated in the acompanying drawings, in which:

FIGURE 1 illustrates a state of events found in prior vacuum columns;

FIGURE 2 illustrates the inner surface of an exit side of a vacuum column shown in FIGURE 3 incorporating an embodiment of this invention;

FIGURE 3 is a cross-sectional front view of a vacuum column using the invention with a tape loop stabilized at an upper position;

FIGURE 4 shows the vacuum column found in FIGURE 3 with a tape loop stabilized at a lower position;

FIGURE 5 illustrates the internal surface of the exit side of the vacuum column shown in FIGURE 4; and FIGURES 6, 7 and 8 provide different views of a vacuum column having an extended form of the invention.

In FIGURE 1, a conventional vacuum column 13 is illustrated. An opening 14 near the bottom of the column connects to a source of vacuum (not shown). A magnetic tape 10 is received from a capstan, not shown), and is passed over an idler 11 into column 13. The tape moves downwardly in the direction of arrow I along an incoming side 16 of the column. At a point 19, the tape forms a loop and travels across the column to an opposite side 15. The tape then moves along side 15 upwardly in the direction of arrow E, until it passes out of the column over another idler 12 where it goes to a takeup reel (not shown). Column 15 is thus its "exit side" in FIGURE 1. A partial vacuum V exists in the column below loop 18; and above loop 18, atmospheric pressure A exists.

As the tape moves in direction —I, it brings with it molecules of air due to frictional engagement with its surface; and these molecules are entrapped in the zone 17 between the tape and column side 16 to build up a pressure therein slightly greater than atmospheric, which prevents the tape from touching side 16 until the tape begins to form loop 18 where it suddenly is brought into communication with the vacuum. Hence the tape touches side 16 along a horizontal line 19, and this is the only place of rubbing on incoming side 16. However, on the exit side 15, air is pumped in upward direction —E to friction and out of the column, due to friction between air molecules and the tape on exit side 15 is maintained below atmospheric, and the tape tends to rub along much of exit side 15 before it is pulled loose at an inward angle by pulley 12. The large area of rubbing on the exit side of the column tends to increase wear of the tape, and accordingly tends to decrease its life.

FIGURE 4 illustrates the tape within the column after the invention is applied. It is noted that the tape along an exit side 25 is maintained substantially out of contact with side 25, thus reducing the area of rubbing for the tape and its corresponding wear. Otherwise in FIGURE 4, the tape movement is substantially the same as shown for FIGURE 1. Furthermore, vacuum column 23 is similar to that shown in FIGURE 1 except for modifications hereafter described. An exit side 25 of column 23 is formed with a plurality of holes 51 vertically aligned. Holes 51 are better illustrated in FIGURE 5 which shows the inner surface of exit side 25. Holes 51 which might be one sixteenth of an inch at diameter and spaced one inch apart. On the inner surface of exit side 25, a plurality of horizontal grooves 52 are provided which intersect respective holes. Furthermore a vertical series of grooves 53 connect holes 51. The grooves permit air coming in through the holes to fan out underneath the tape.

In operation, as the tape moves upwardly along exit side 25, it tends to pump out air and reduce the pressure beneath it. However, atmospheric pressure external to holes 51 tends to bring in air beneath the tape as fast as it can be pumped out by tape friction. Thus the air pressure between the tape and exit side 25 cannot be reduced significantly below atmospheric pressure, and the rubbing force is removed or reduced to the point of eliminating wear. Furthermore, the tape is easily maintained away from exit side 25 throughout most of its length by virtue of the inward angular position of pulley 12, which tends to pull the tape away from exit side 25.

In many high-speed tape transports the tape loop is positioned in either the upper or the lower part of a column depending upon tape direction, in order to gain maximum efficiency for slack-loop buffering with a vacuum column; and thus is found with the tape transport in the above-cited Patent No. 2,792,217. Thus, for the direction of movement shown for the tape in FIGURE 4, loop 18 is positioned near the bottom of the column. On the other hand, if the tape direction is reversed, loop 18 is then stabilized near the top of the column, as shown in FIGURE 3.

With the reversed direction of movement of the tape in FIGURE 4, the tape comes in along side 25, which now becomes the "incoming side"; and the tape exits along side 26, which now becomes the "exit side." Accordingly, the problem is reversed to prevent the clinging of the tape along side 26 above loop 18. In a like manner, a series of holes 41 are provided above the boundary of loop 18 on exit side 26. Hence holes 41 communicate atmospheric pressure beneath the tape and prevent it from clinging against side 26 for the same reasons which were mentioned with respect to side 25 when the tape was moving in the other direction.

An undesirable characteristic of holes 51 below loop 18 in FIGURE 3 is that they permit air flow into the vacuum region V, thus increasing the required vacuum pumping capacity for the system. However, by maintaining holes 51 relatively small, the added loading of air into the vacuum is maintained at level which does not substantially interfere with the vacuum operation.

However, the embodiments in FIGURES 6, 7 and 8 shows means for entirely preventing the loading of air into the vacuum through holes 51 when loop 18 is in its upper position. In this case, an additional set of openings 61 is provided in an adjacent side of the vacuum column 60, which may be either the front or back side between sides 25 and 26. A plurality of air-tight tubes 52 connect corresponding holes 51 and 61 on the bottom portion of the vacuum column. A corresponding hole 61 is lower than its connected hole 51 due to the holes 61 being by the lowest portion of loop 18. Thus corresponding holes 51 and 61 tend to be covered and uncovered together by downward and upward movements of loop 18.

No tube arrangement is needed for holes 41 near the top portion of the column, because they almost never communicate with vacuum region V. Thus when loop 18 is in its upper position, the lower tubes 52 all have both ends connected to the vacuum region V; and no leakage is provided through the holes 51 or 61 into the vacuum chamber V. On the other hand when loop 18 is in its bottom position in FIGURE 6, it is noted that all of the holes 61 communicate atmospheric pressure A to all the holes 51 as required.

The most important of the openings in an exit side is the single opening first found above the lowest point of steady contact of the tape with an exit side of the column.

The grooves formed on the inner surface of the exit side to increase the effectiveness of the openings by permitting the spread of atmospheric pressure beneath the tape. However, the transverse grooves appear to be more effective than the longitudinal grooves, and the grooves can of course be formed in any manner along the inner wall connecting to the holes.

While the invention has been particularly shown and described with reference to preferred embodiments thereof, it will be understood by those skilled in the art that various changes in form and details may be made therein without departing from the spirit and scope of the invention.

What is claimed is:

1. Means for reducing the area of tape rubbing against an exit side of a vacuum column, comprising at least one opening formed through said exit side at its minimum position of steady tape rubbing, at least one opening formed in a comparable position through an adjacent side of said vacuum column, and a tube connecting said openings.

2. Means for reducing tape rubbing as defined in claim 1 in which grooves are formed on the inner surface of said exit side connecting to said openings.

3. Means for reducing the area of tape rubbing against a vacuum column, wherein tape is driven in forward and backward directions, and a tape loop stabilizing in said column near its top or near its bottom, depending upon tape direction, said improvement comprising at least one opening formed through a first exit wall of said column slightly above the bottom position of said loop, and at least one opening formed through the other exit side of said vacuum column for the other tape movement direction at a location slightly above the top position of said loop, a plurality of openings provided above said one opening in each of said exit sides, grooves being formed on the inner surface of said exit sides connecting to some of said openings, wherein openings are formed in another side of said vacuum column which is adjacent to said exit sides, the openings in the adjacent side corresponding to holes about said bottom position of said loop, and a plurality of tubes connecting corresponding openings.

References Cited by the Examiner

UNITED STATES PATENTS

| | | | |
|---|---|---|---|
| 2,892,370 | 6/1959 | Cooper | 226—97 X |
| 2,990,990 | 7/1961 | Wilkins | 226—118 X |
| 3,122,332 | 2/1964 | Hughes | 242—55.12 |

ROBERT B. REEVES, *Primary Examiner.*

JOSEPH P. STRIZAK, RAPHAEL M. LUPO,
*Examiners.*